United States Patent [19]
Akhavi et al.

[11] Patent Number: 4,485,061
[45] Date of Patent: Nov. 27, 1984

[54] METHOD AND APPARATUS FOR FORMING ROUNDED ENDS ON PLASTIC FILAMENTS

[75] Inventors: David S. Akhavi, Westwood; Richard W. Cudworth, Upland, both of Calif.

[73] Assignee: Iolab Corporation, Covina, Calif.

[21] Appl. No.: 532,349

[22] Filed: Sep. 15, 1983

[51] Int. Cl.³ .......................................... B29C 17/12
[52] U.S. Cl. .................... 264/161; 264/1.5; 264/157; 264/163; 264/323; 264/325; 425/392; 425/395; 425/806; 425/808
[58] Field of Search ...................... 3/13; 425/392, 395, 425/806, 808; 264/1.5, 1.7, 2.7, 157, 159, 161, 276, 320, 322, 163, 323, 325

[56] References Cited
U.S. PATENT DOCUMENTS

| 2,148,079 | 2/1939 | Martin | 425/806 R |
| 2,976,573 | 3/1961 | Davis | 264/161 |
| 2,976,575 | 3/1961 | Daubenberger | 264/320 |

*Primary Examiner*—Jay H. Woo
*Assistant Examiner*—Michael McGurk
*Attorney, Agent, or Firm*—Donal B. Tobin

[57] ABSTRACT

A method and apparatus for forming a round end on a small plastic filament which includes a die having a channel extending into one side with a hemispherical interior end and a bore extending into the other side and coaxially aligned with the channel and having a conic interior end. The tip of the conic section communicates with the hemispherical section. A relief recess is spaced from the periphery of the hemispherical section by a land portion. The peripheral edge of the land portion, which also forms the edge of the channel, may be formed into a knife edge. In the die the filament is cold-formed to provide a hemispherical section spaced apart from the distal end of the filament. Material displaced during the cold-forming process is deposited in a relief section extending peripherally about the channel. When the cold-formed filament is removed from the die, the portion of the filament distal of the hemispheric portion is cut off and discarded, and the flash and displaced material is removed from the filament by abrasive tumbling.

9 Claims, 11 Drawing Figures

METHOD AND APPARATUS FOR FORMING ROUNDED ENDS ON PLASTIC FILAMENTS

FIELD OF THE INVENTION

The present invention relates to an apparatus and process for forming round ends on thin plastic filaments.

BACKGROUND OF THE INVENTION

Thin plastic filaments made of polypropylene or some other suitable, nontoxic material are used to support certain types of intraocular lenses within the eye after it has been implanted to replace the natural lens of the eye that has been removed to correct some vision impairment, for example cataracts. Such support filaments are used on lenses like that shown in U.S. Pat. No. 4,159,546 (the Shearing patent). The properties and use of such support filaments are thoroughly described in the Shearing patent which is incorporated by reference in this patent application.

It will be appreciated that all the surfaces of the intraocular lens should be smooth and rounded to avoid damaging the eye during intraocular lens implant surgery or during use of the lens after implantation. It is particularly important that the free end of the support loops shown in the Shearing patent be as round and smooth as possible to avoid damaging the interior anatomy of the eye.

In the past, various loop finishing processes have been used to remove sharp corners that result from cutting and forming the loops during the manufacturing process. Thermal forming and abrasive tumbling have been used to provide this smoothing. Although these methods remove sharp edges and provide an acceptable degree of rounding to the ends of the loops, further improvement to form an ideal hemispherical end would be desirable.

Other methods for smoothing and rounding the terminal portion of an open loop are shown in U.S. Pat. No. 4,242,760 where a knob is fixed to the end of the open loop to prevent damage to human tissue within the eye. Similar rounded ends for support loops are shown in U.S. Pat. Nos. 4,244,060 and 4,366,582.

It would be desirable to have an improved apparatus and method for forming round ends on small plastic filaments.

SUMMARY OF THE INVENTION

The present invention provides an apparatus and a method for forming round ends on small plastic filaments. A die is formed of two die blocks. Each die block has an interface surface in which is formed one-half of a die cavity, so that when the die blocks are placed together in proper registration with the interface surfaces facing each other a complete die cavity is formed. The exterior surfaces of each die block are preferably rectangular, but any convenient shape may be used. The interface surface of each die block has a first channel extending into the die from one of its exterior surfaces, and each first channel has an interior end formed into a section of the hemisphere so that when the die blocks are brought together, the die forms a tubular cavity which terminates in a hemisphere. Each of the first channels has a relief recess spaced a fixed distance from its peripheral edge. Each of the blocks also has a land area between the relief recess and the peripheral edge of the first channel.

Each of the die blocks also has a second channel extending into the other of its opposite surface aligned coaxially with the first channels and extending into the first channels. When the die blocks are placed together, the first channels preferably form a tubular cavity with a hemispherical end, and the second channels form a tubular cavity with a conic end. The tip of the cone touches the hemisphere and provides an aperture through which the two parts of the die cavity meet. This die is preferably used for a filament whose diameter is substantially equal to the diameter of the first channel.

A filament is placed along the interface surface of one die block so that it rests in the first channel and its distal end extends beyond the hemispherical end of the first channel into the second channel. When the die blocks are closed together in proper registration, the land areas between the first channel and the relief recess of each die block come together to cold-form part of the fiber into a hemispherical section. The portion of the fiber which is located distally of the hemispherical section rests in the second channel, and the conic surfaces of the second channel contact the fiber to provide an axially-extending, distally-directed force which tends to pull the fiber into the cavity to help form the hemispherical section. When the die closes, part of the fiber is displaced and flows through any space in the confronting surfaces of the land area into the surrounding relief recess. When the die is open, the fiber has been cold formed to provide a conical portion whose tip is aligned with a hemispherical portion. Surrounding the tip and the hemisphere is a ribbon of flash and a quantity of material that has been displaced when the conic tip and the hemispherical portion were formed.

After the fiber is removed from the die, it is cut at the tip of the cone. The cone portion is discarded, and the remaining portion of the filament is subjected to abrasive tumbling to remove the flash and the displaced material.

The present invention provides a method and an apparatus for forming a smooth, rounded end on a small plastic filament.

These and other features and advantages of the present invention will become apparent from the following detailed description of the preferred embodiments taken in conjunction with the following drawings.

DETAILED DESCRIPTION OF THE PREFERRED EMBODIMENT

Figure 1:
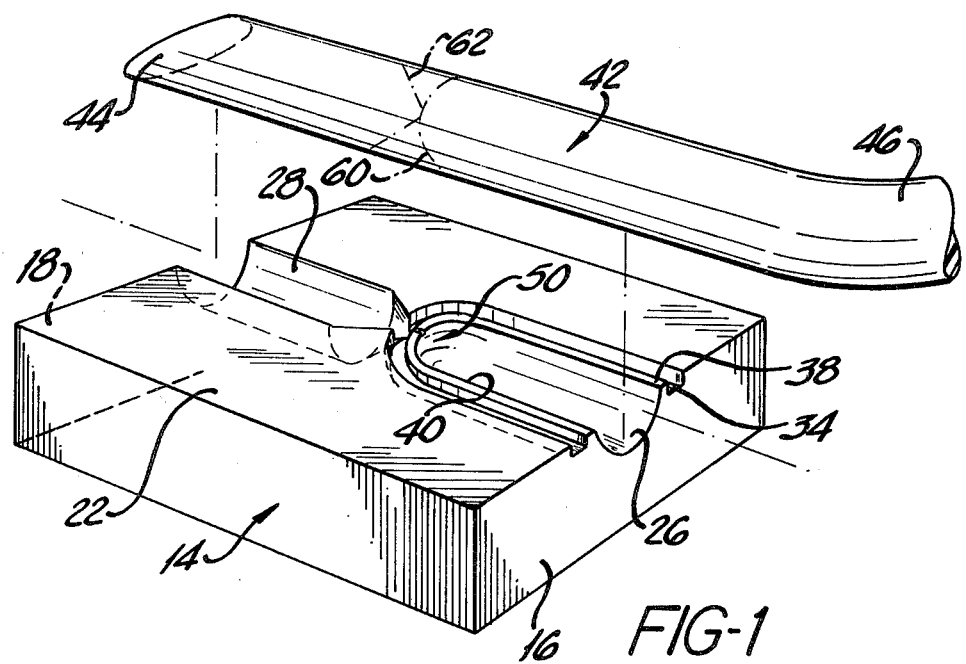
FIG. 1 shows a perspective view of one of the two die blocks of the present invention.
Figure 2:
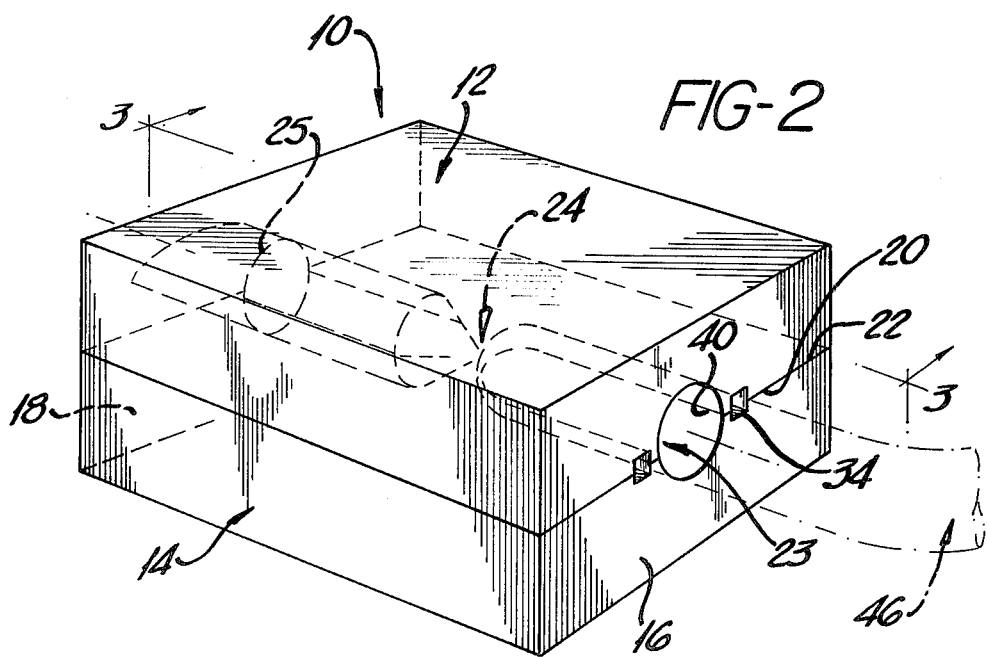
FIG. 2 shows a perspective view of the two die blocks closed.
Figure 3:
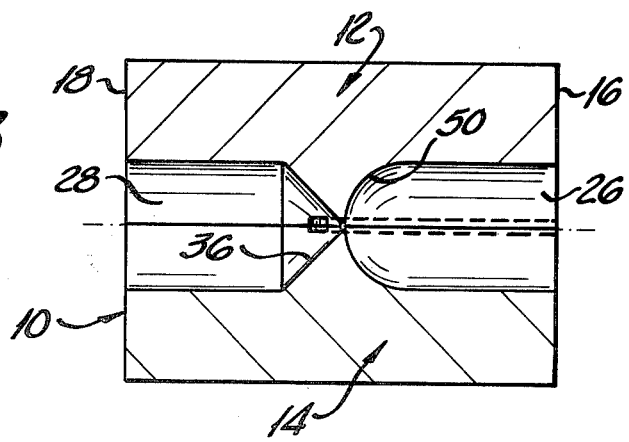
FIG. 3 shows an axial cross-sectional view of the die of the present invention taken along lines 3—3 in FIG. 2.

Referring now to FIG. 2 there is shown a die 10 having a first die block 12 and a second die block 14. Each die block, 12 and 14, has opposite sides 16 and 18 and interface sides 20 and 22. When the two interface sides 20 and 22 of die blocks 12 and 14 are placed in confronting relationship, channels formed in the interface sides come together in proper registration to form a die cavity 24.

Tubular die cavity 24 has two parts: a hemispherical end part 23 and a conical end part 25. Hemispherical end part 23 extends into first side 16 of die 10 so that one-half of a cylindrical channel 26 is cut in each of die blocks 14 and 16. Channel 26 extends a fixed distance into die 10. Conical end part 25 extends into the opposite side 18 of die 10 and is coaxially aligned with hemispherical end part 23. In the preferred embodiment, the diameter of hemispherical part 23 and conical part 25 are the same, but they need not be the same. The tip of conical end part 25 extends through the hemispherical end 23. An aperture 32 is created to provide communication between the two parts 23 and 25 of cavity 24. Aperture 32 is made very small but, as will be explained later in the application, it is large enough to permit the filament which is formed by the die to remain in one piece without being cut during the cold-forming process.

The half of cylindrical end part 23 that is placed in each die block 12 and 14 will be referred to as first channel 26, and the half of each conical end part 25 that is placed in each die block 12 and 14 will be referred to as second channel 28.

Figure 4:
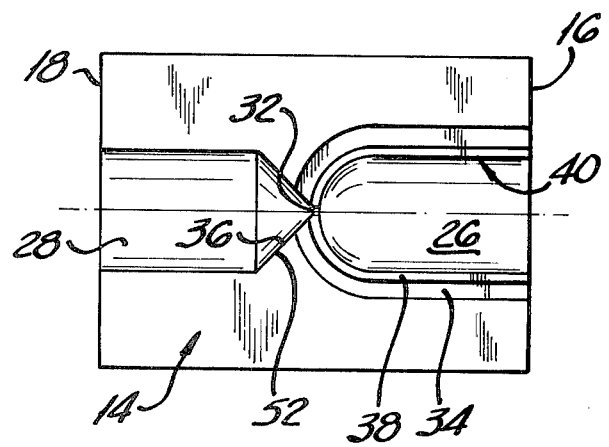
FIG. 4 shows another view of the die of FIG. 1.
Figure 5:
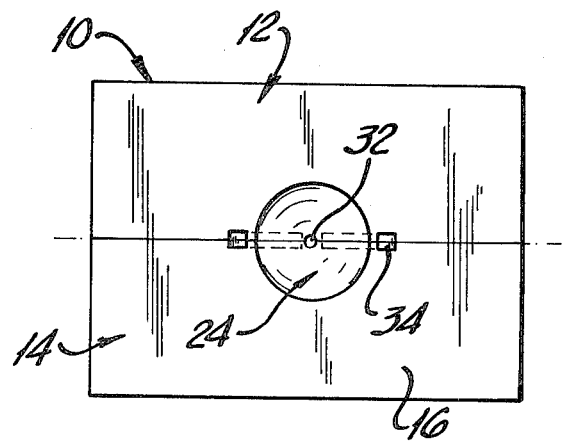
FIG. 5 shows an additional view of the die of FIG. 2.
Figure 6:
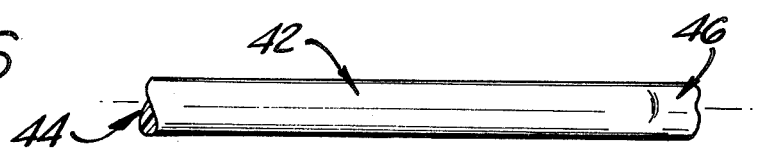
FIG. 6 shows a filament prior to being formed by the present invention.

A recess 34 is provided into interface surfaces 20 and 22 of die blocks 12 and 14 respectively. Recess 34 is spaced a fixed distance from the periphery of first channel 26. Recess 34 extends preferably completely about the periphery of first channel 26 but must extend at least about the hemispherical interior end portion of channel 26. Referring again to FIG. 4, it can be seen that recess 34 will intersect the conic surface 36 of second channel 28.

A land portion 38 separates the periphery of first channel 26 from relief recess 34.

In the process of the present invention, a filament 42 having a distal end 44 and a proximal end 46 is placed along interface surface 22 of die block 14 with the distal end 44 extending past the hemispherical end portion 50 of first channel 26, and past the conic section 52 of second channel 28 into the remainder of second channel 28. It is not important how far distal end 44 of filament 42 extend into second channel 28 as long as it extends past conic section 52. The axis of filament 42 should be aligned with the axis of first channel 26 and second channel 28. Die block 12 is then closed onto die block 14 so that interface surfaces 20 and 22 are in precise registration with one another to form die cavity 24 about filament 42 and to cold-form filament 42 according to the geometry of die cavity 24.

Figure 7:
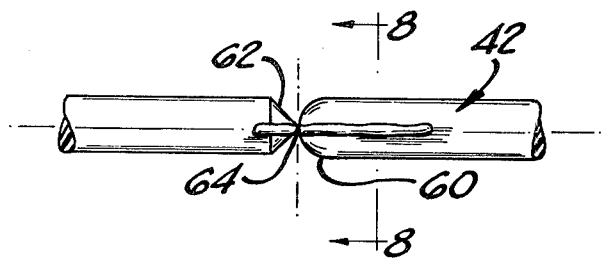
FIG. 7 shows a filament after it has been cold-formed according to the present invention.
Figure 8:
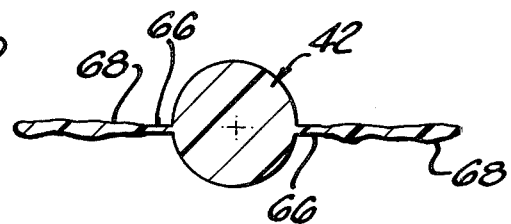
FIG. 8 shows a transverse cross-sectional view of the filament of FIG. 7 taken along lines 8—8 of FIG. 7.
Figure 9:
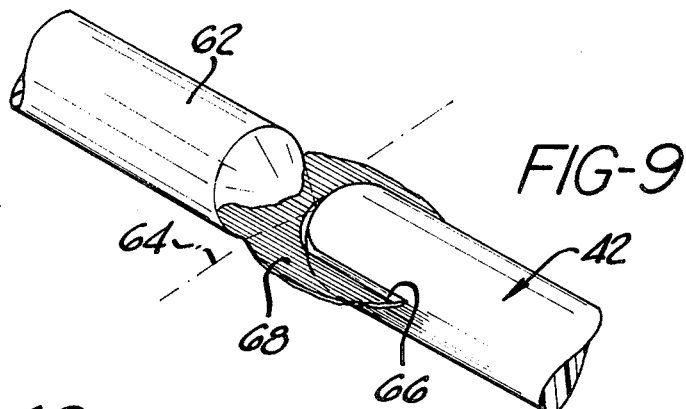
FIG. 9 shows a perspective view of the filament of FIG. 7.
Figure 10:
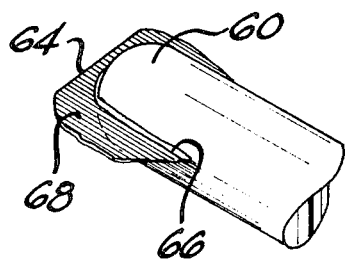
FIG. 10 shows an additional perspective view of the filament of the present invention; and, FIG. 11 shows a perspective view of the finished filament.
Figure 11:
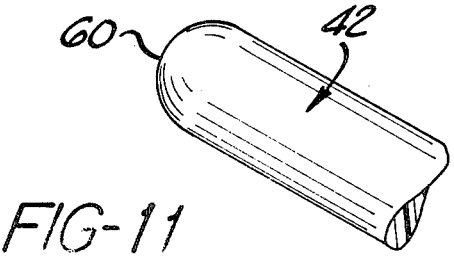

Referring now to FIG. 7, it can be seen that the cold-forming process shapes filament 42 into two sections. A hemispherical portion 60 is formed on filament 42 at a point spaced proximally from distal end 44 of filament 42. A conic portion 62 is formed in conic section 52 and second channel 28, and the tip 64 of conic section 62 is coaxially aligned and integral with the center of hemispherical portion 60. The connection at the tip 64 and hemisphere 60 is permitted during the cold-forming process by the presence of aperture 32 which provides communication between first channel 26 and second channel 28.

It will be appreciated that a portion of the closing force for die 10 is transmitted through conic surface 36 of second channel 28 to the conic section 62 of filament 42 to provide an axially-aligned, distally-directed force on the conic section 62 of filament 42. This force helps form a hemispherical section 60 of filament 42 by making sure that filament 42 is drawn completely into the hemispherical portion 50 of first channel 26.

When die blocks 12 and 14 are closed together and filament 42 is shaped as shown in FIG. 7, the material which is compressed by the die to form hemispherical section 60 and conic section 62 is directed into relief recess 34. The width of land area 38 is small, about 0.002 inches. This gives land area 38 a small area, and thus a high pressure is created when die 10 is closed. As die blocks 12 and 14 start to close on filament 42, excess material which is removed from filament 42 to form hemispherical section 60 and conic portion 62 flow across land area 38 into relief recess 34. As die blocks 12 and 14 continue to close, great pressure on land area 38 creates a very thin flash area 66. Substantially all of the material displaced from filament 42 to form conic section 62 and hemispherical section 60 is displaced into relief recess 34 and spaced apart from the periphery of filament 42 by a distance equal to the width of land 38. The excess material 68 which is displaced into recess 34 may be easily removed from filament 42 by abrasive tumbling, since it is connected to filament 42 by a thin flash area 66.

Filament 42 is then removed from die 10 and conic section 62 of filament 42 is cut from the hemispheric portion 60 of filament 42. The cut is made at tip 64 of conic section 62. Conic section 62 is discarded and the remaining portion of filament 42 which has hemispheric section 60 is subjected to abrasive tumbling to remove flash 66 and the excess material 68 which is displaced during the cold-forming operation. The abrasive tumbling process is well known to those skilled in this art and will not be described in detail in this patent application.

It will be seen that the present invention provides an apparatus and a method for forming a round end on a thin plastic filament. The present invention has been described in conjunction with certain preferred embodiments. Those skilled in this art will appreciate that many modifications and changes may be made to the preferred embodiments without departing from the present invention. It is, therefore, not intended to limit the present invention except as set forth in the appended claims.

We claim:

1. A die for cold-forming a round end on small plastic filaments comprising:
   first and second generally rectangular die blocks each having opposite sides and an interface side joining said opposite sides;
   each of said interface sides formed to provide one-half of an open die cavity so that when said interface sides are placed in confronting relationship, a complete die cavity is formed;

the one-half of said die cavity formed in said interface surface of each of said blocks having first an channel extending into one of said opposed sides, having an interior end formed into a portion of a hemisphere so that when said first and second die block interface surfaces are placed in confronting relationship a complete hemispherical end is formed at said interior end and said channel having an open end exposing the mold cavity to the atmosphere;

each of said interface surfaces having a relief recess spaced a fixed distance from the peripheral edge of said first channel and extending along the periphery of said first channel;

each of said interface surfaces having a very narrow land area approximately a knife edge between said relief recess and said first channel peripheral edge;

each of said interface surfaces having a second channel extending into the other of said opposite sides coaxially with said first channel and communicating with said first channel through a small aperture so that when said interface sides are placed in confronting relationship, said first and second channels will be in communication.

2. The die of claim 1 wherein said second channel includes an interior end formed into a cone when said interface sides of said first and second die blocks are placed in confronting relationship with the tip of said cone extending into said hemispherical end.

3. The die of claim 1 wherein said first channel forms a cylinder when the interfaced sides of said first and said second die blocks are placed in confronting relationship.

4. The die of claim 3 wherein the diameter of said cylinder is substantially the same as the diameter of said filament.

5. A process for forming a round end on a small plastic filament, said filament having a proximal end and a distal end, said process comprising the steps of:

cold-forming a hemispherical portion on said filament at a point spaced from the distal end of said filament;

during said cold-forming, exerting an axially aligned, distally directed force on the portion of said filament located distally of said hemispherical portion; and whereby substantially all excess material is laterally displaced from the surface of said filament during the cold-forming of said hemispherical portion, via a land area into a relief recess, but leaving at least a portion of said displaced material connected to said filament with a thin flash of filament material;

after said cold-forming is completed, cutting the portion of said filament located distally of said hemispherical section from said filament; and, removing any flash and displaced material from the remaining filament to leave a smooth, rounded end.

6. The process of claim 5 wherein the step of removing flash and displaced material includes the step of subjecting said filament to abrasion to remove said flash and displaced material.

7. The process of claim 5 wherein said removing step includes the step of tumbling the filament in an abrasive medium.

8. The process of claim 5 wherein the step of exerting a force on the distal portion of said filament includes the step of cold-forming a cone into said filament, said cone having a tip connected to said hemispherical portion substantially at the axis of said filament, the surface of said cone transmitting said axially-aligned distally-directed force.

9. The process of claim 5 wherein said cold-forming includes the step of placing a filament along an interface surface of a first die block, said interface surface including a portion of a die cavity;

closing a second die block having a second interface side having a corresponding portion of said die cavity to form a complete die cavity between the interface sides of said first and second die blocks;

subjecting said die to sufficient force to cold-form said filament for a time sufficient to permit the cold-forming process to occur;

removing said cold-formed filament from said die.

* * * * *